United States Patent
Bushell et al.

(10) Patent No.: US 8,787,662 B2
(45) Date of Patent: Jul. 22, 2014

(54) METHOD AND SYSTEM FOR IDENTIFYING TOKENS IN AN IMAGE

(75) Inventors: Steven Joseph Bushell, Cranston, RI (US); Casey Arthur Smith, Grand Junction, CO (US)

(73) Assignee: Tandent Vision Science, Inc., San Francisco, CA (US)

( * ) Notice: Subject to any disclaimer, the term of this patent is extended or adjusted under 35 U.S.C. 154(b) by 343 days.

(21) Appl. No.: 12/927,237

(22) Filed: Nov. 10, 2010

(65) Prior Publication Data

US 2012/0114231 A1    May 10, 2012

(51) Int. Cl.
G06K 9/00    (2006.01)
G06T 7/00    (2006.01)

(52) U.S. Cl.
CPC ..... *G06T 7/0081* (2013.01); *G06T 2207/30201* (2013.01); *G06T 2207/10024* (2013.01); *G06T 2207/20141* (2013.01); *G06T 2207/20148* (2013.01)
USPC .......................................................... 382/165

(58) Field of Classification Search
None
See application file for complete search history.

(56) References Cited

U.S. PATENT DOCUMENTS

| | | | |
|---|---|---|---|
| 5,204,737 A | 4/1993 | Hakkaku et al. | |
| 6,295,371 B1 | 9/2001 | Rucklidge et al. | |
| 6,480,624 B1 | 11/2002 | Horie et al. | |
| 7,672,530 B2 | 3/2010 | Friedhoff et al. | 382/266 |
| 7,984,847 B1 * | 7/2011 | Knouff et al. | 235/379 |
| 2004/0220466 A1 * | 11/2004 | Matsumoto | 600/407 |
| 2006/0177149 A1 * | 8/2006 | Friedhoff et al. | 382/274 |
| 2007/0177797 A1 * | 8/2007 | Smith et al. | 382/164 |
| 2009/0034835 A1 | 2/2009 | Maxwell et al. | 382/164 |
| 2009/0136153 A1 * | 5/2009 | Hasegawa | 382/278 |
| 2009/0245651 A1 | 10/2009 | Friedhoff et al. | 382/199 |
| 2010/0085452 A1 * | 4/2010 | Hirakawa et al. | 348/273 |
| 2010/0142825 A1 | 6/2010 | Maxwell et al. | 382/199 |
| 2011/0150358 A1 * | 6/2011 | Smith et al. | 382/274 |

* cited by examiner

*Primary Examiner* — Jingge Wu
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, identifying token regions in the image as a function pixel color comparisons relative to threshold values and varying the threshold values in selected areas of the image.

9 Claims, 5 Drawing Sheets

Identifying Token Regions in an Image

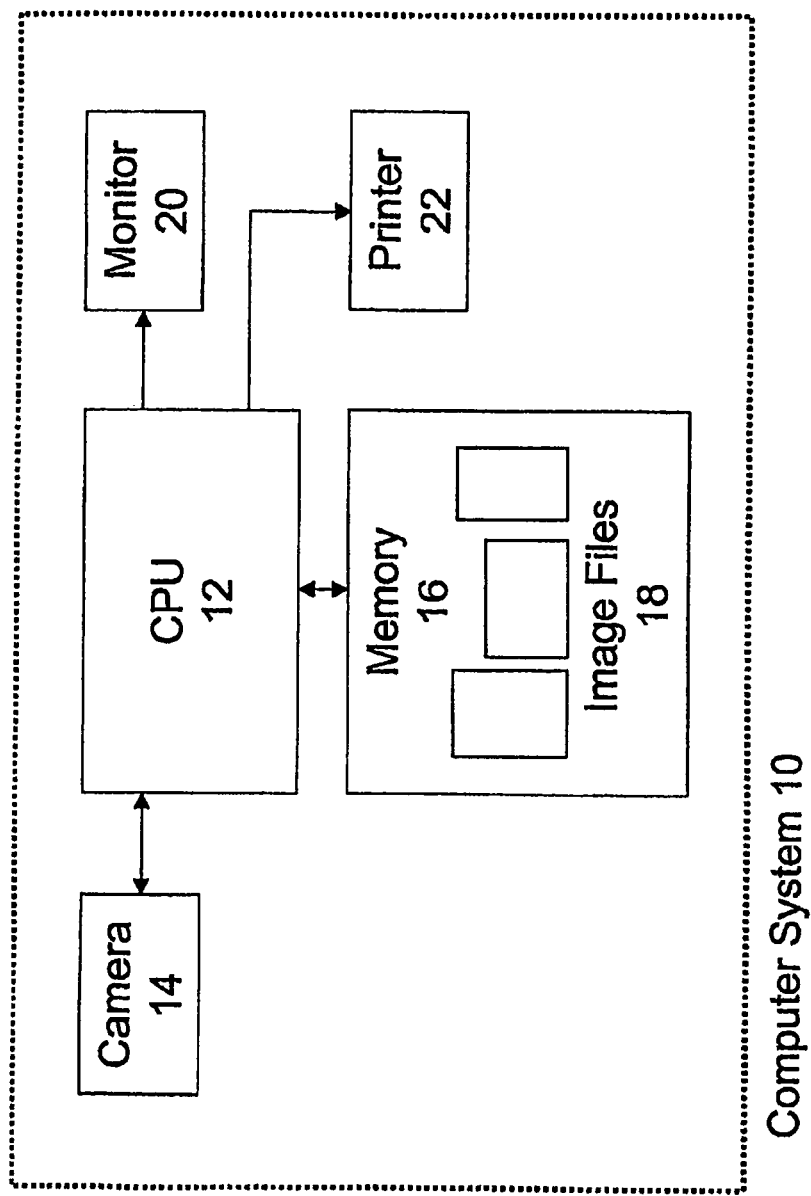
Figure 1: Computer System Configured to Operate on Images

Figure 2: Pixel Array for Storing Image Data

| P(1, 1) | P(1, 2) | ... | P(1, M) |
|---------|---------|-----|---------|
| P(2, 1) | P(2, 2) | | |
| P(3, 1) | P(3, 2) | | |
| ... | | | ... |
| P(N, 1) | ... | ... | P(N, M) |

Image File 18

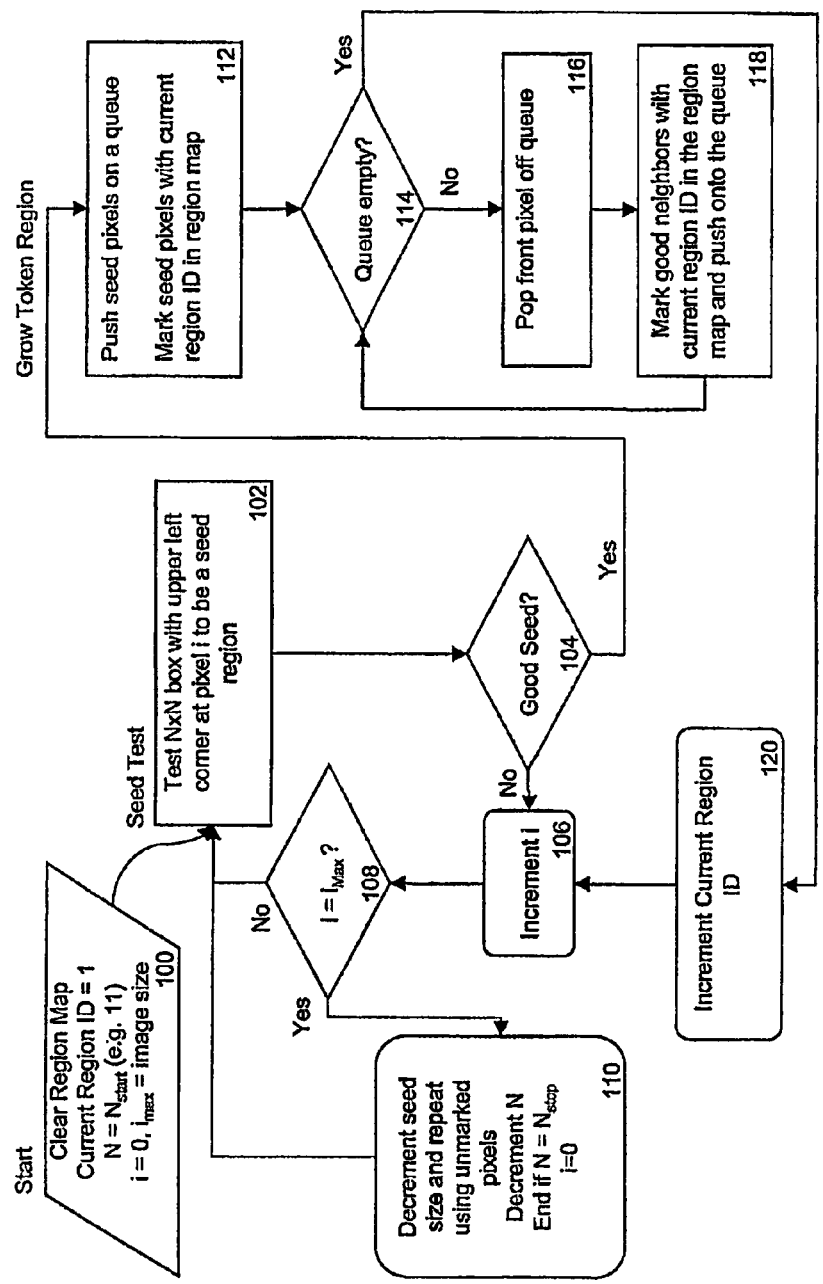
Figure 3 : Identifying Token Regions in an Image

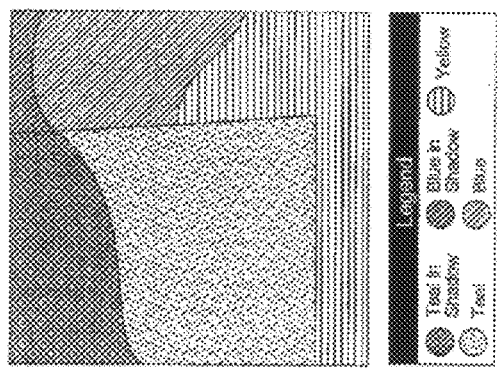
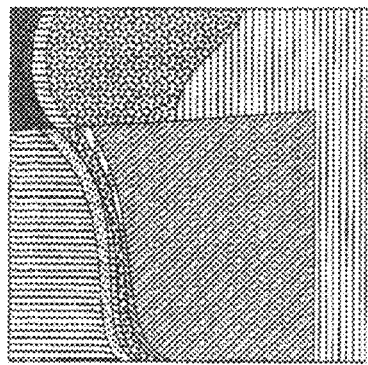
Figure 4a: Original Image       Figure 4b: Token Regions
Figure 4a, 4b: Examples of Identifying Token Regions in an Image

METHOD AND SYSTEM FOR IDENTIFYING TOKENS IN AN IMAGE

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance.

SUMMARY OF THE INVENTION

The present invention provides a method and system implementing an image processing technique that utilizes spatio-spectral information relevant to an image, to perform an operation to identify regions of an image in a manner that optimizes the image for further processing to accurately and correctly identify and separate illumination and material aspects of the image.

In a first exemplary embodiment of the present invention, an automated, computerized method is provided for processing an image. According to a feature of the present invention, the method comprises the steps of providing an image file depicting an image, in a computer memory, identifying token regions in the image as a function of pixel color comparisons relative to threshold values and varying the threshold values in selected areas of the image.

In a second exemplary embodiment of the present invention, a computer system is provided. The computer system comprises a CPU and a memory storing an image file containing an image. According to a feature of the present invention, the CPU is arranged and configured to execute a routine to identify token regions in the image as a function of pixel color comparisons relative to threshold values and vary the threshold values in selected areas of the image.

In a third exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, identify token regions in the image as a function of pixel color comparisons relative to threshold values and vary the threshold values in selected areas of the image.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3 is a flow chart for identifying Type C token regions in the image file of FIG. 2, according to a feature of the present invention.

FIG. 4a is an original image used as an example in the identification of Type C tokens.

FIG. 4b shows Type C token regions in the image of FIG. 4a.

DETAILED DESCRIPTION OF THE PREFERRED EMBODIMENTS

Figure 5:
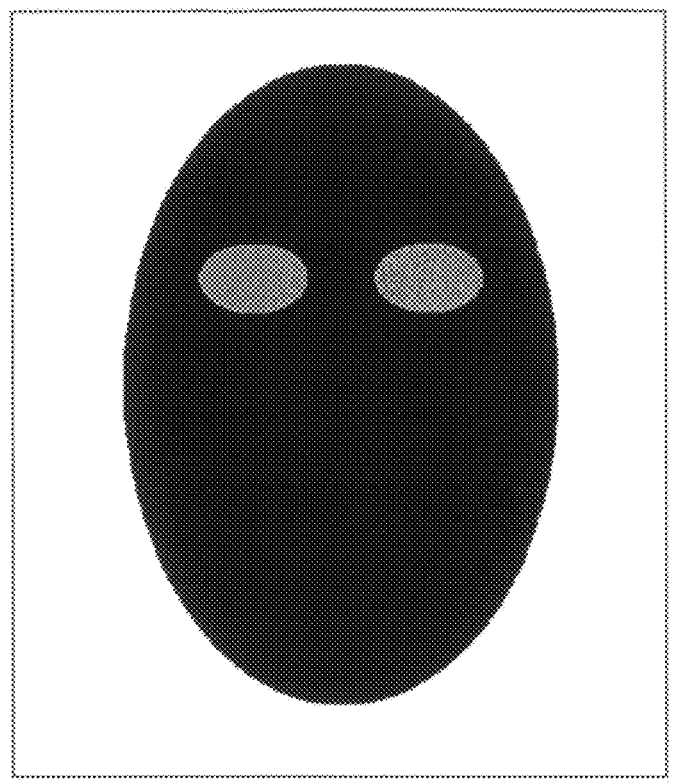
FIG. 5 shows a mask arrangement for identifying an important area of an image, in an example of a face.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to, for example, a set of color bands, for example, red, green and blue color components (RGB) of the picture element, or a single grayscale value. The present invention is applicable to any multi-band image, where each band corresponds to a piece of the electro-magnetic spectrum, or to a single grayscale image depiction. The pixel array includes n rows of m columns each, starting with the pixel p (1,1) and ending with the pixel p(n, m). Thus, each pixel can be uniquely identified by p(r,g,b,x,y) wherein the r,g,b values provide the pixel color, and x,y the position within the n×m pixel array of FIG. 2. When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a method and system to identify regions of an image in a manner that optimizes the image for further processing to accurately and correctly identify and separate the illumination and material aspects of the image. The illumination and material aspects of an image can be used to generate intrinsic images. The intrinsic images correspond to an original image, for example, an image depicted in an input image file 18.

For example, the intrinsic images include an illumination image, to capture the intensity and color of light incident upon each point on the surfaces depicted in the image, and a material reflectance image, to capture reflectance properties of surfaces depicted in the image (the percentage of each wavelength of light a surface reflects). Such intrinsic images provide the CPU 12 with images optimized for more effective and accurate further processing. Thus, the intrinsic images can be used to enhance the accuracy and efficiency of image processing, image analysis and computer vision applications.

According to a feature of the present invention, regions of an image are defined as tokens. A token is a connected region of an image wherein the pixels of the region are related to one another in a manner relevant to identification of image features and characteristics such as an identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type C token comprises a connected image region of similar image properties among the contiguous pixels of the token, where similarity is defined with respect to a noise model for the imaging system used to record the image.

Type C tokens can be readily identified in an image, according to a feature of the present invention, and then analyzed and processed to construct Type B tokens, as will be described below. FIG. 3 is a flow chart for identifying Type C token regions in the image file of FIG. 2, according to a feature of the present invention. A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, i=1, pixel (1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array.

In an exemplary embodiment of the present invention, the color values comparison can be with respect to multiple color band values (RGB in our example) of the selected pixel. For example, the Euclidean distance between the selected pixel and a neighboring pixel in the N×N array, in a log color space, relative to a threshold value. In the exemplary embodiment, for pixels $P_1$ and $P_2$, the distance D is defined as follows:

$$D=\text{square root}((R_1-R_2)^2+(G_1-G_2)^2+(B_1-B_2)^2))$$

then: D≤threshold value

According to a feature of the present invention, the threshold value is set as a function of the location of the N×N array within the image being analyzed. For example, in a face recognition process, certain areas of the image, such as the skin of a face, are considered more important than other areas of the image, such as the eyes and background areas of the image. Thus, a more precise analysis of the more important areas of an image can be supported by a tighter threshold value for pixel comparison, in the important areas, to provide a more discriminative token identification in the important areas. For less important areas of the image, looser threshold values are used, resulting in less precise and larger, less discriminative Type C tokens.

If the comparison does not result in approximately equal values (within the noise levels of the recording device, as represented by the threshold value) for the pixels in the seed, the CPU 12 increments the value of i (step 106), for example, i=2, pixel (1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID.

According to a further feature of the present invention, a comparison for good neighbors of a pixel from the queue (step 118) is made as a function of a Euclidean distance relative to a second threshold value, different from the threshold value used in the seed analysis of step 104. Again, the threshold values used in step 118 vary according to the importance of the area of the image where the tokenization is being performed, for example, as set during the performance of step 104. Thus there is a seed threshold value, for use during performance of step 104, and a grow threshold, for use during performance of step 118.

FIG. 5 shows a mask arrangement for identifying an important area of an image, in an example of a face. A known eye locator can be used to locate eyes in an image including a human face. A simple oval-shaped mask is then generated around the eye locations to generally conform to what should correspond (determined empirically) to skin regions of the face. An example for the seed threshold and grow threshold values used in pixel color comparisons in a tokenization process can be as follows:

Face region (for pixels within the oval mask):
Seed Threshold: 0.10
Grow Threshold: 0.15
Eye Region (for pixels for the identified eyes, cut out from the mask):
Seed Threshold: 0.15
Grow Threshold: 0.25
Background Region (for pixels in the image outside the mask):
Seed Threshold: 0.20
Grow Threshold: 0.35

All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at N=$N_{stop}$, step 110 of the flow chart of FIG. 3, or completion of a region map that coincides with the image, the routine will have completed the token building task. FIG. 4a is an original image used as an example in the identification of tokens. The image shows areas of the color blue and the blue in shadow, and of the color teal and the teal in shadow. FIG. 4b shows token regions corresponding to the region map, for example, as identified through execution of the routine of FIG. 3 (Type C tokens), in respect to the image of FIG. 4a. The token regions are color coded to illustrate the token makeup of the image of FIG. 4a, including penumbra regions between the full color blue and teal areas of the image and the shadow of the colored areas.

U.S. Patent Publication No. US 2010/0142825 teaches a constraint/solver model for segregating illumination and material in an image, including, for example, an optimized solution based upon a same material constraint. A same material constraint, as taught in U.S. Patent Publication No. US 2010/0142825, utilizes Type C tokens, as can be determined according to the teachings of the present invention, and Type B tokens, as identified according to the teachings of U.S. Patent Publication No. US 2010/0142825. The constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Implementation of the constraint/solver model according to the techniques and teachings of U.S. Patent Publication No. US 2010/0142825, utilizing Type C tokens and Type B tokens, provides a highly effective and efficient method for generating intrinsic images corresponding to an original input image. The intrinsic images can be used to enhance the accuracy and efficiency of image processing, image analysis and computer vision applications.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
providing an image file depicting an image, in a computer memory;
identifying token regions in the image as a function of pixel color comparisons relative to threshold values, wherein the threshold values determine the pixel color comparisons used to identify the token regions and are each based upon a Euclidean distance between pixels in a color space; and
varying the threshold values in selected areas of the image to vary a level of analysis precision for pixel color comparisons used to identify the token regions, for token identification among the selected areas of the image.

2. The method of claim 1 wherein the step of varying the threshold values in selected areas of the image is carried out to vary threshold values such that resulting token regions are relatively more discriminative in a selected area of the image.

3. The method of claim 1 wherein the step of identifying token regions in the image as a function of pixel color comparisons relative to threshold values is carried out by performing pixel color comparisons in each of a seed step and a grow step.

4. The method of claim 3 wherein different threshold values are used in each of the seed step and grow step.

5. A computer system which comprises:
a CPU; and
a memory storing an image file containing an image;
the CPU arranged and configured to execute a routine to identify token regions in the image as a function of pixel color comparisons relative to threshold values, wherein the threshold values determine the pixel color comparisons used to identify the token regions and are each based upon a Euclidean distance between pixels in a color space, and vary the threshold values in selected areas of the image to vary a level of analysis precision for pixel color comparisons used to identify the token regions, for token identification among the selected areas of the image.

6. A computer program product, disposed on a non-transitory computer readable media, the product including computer executable process steps operable to control a computer to: provide an image file depicting an image, in a computer memory, identify token regions in the image as a function of pixel color comparisons relative to threshold values, wherein the threshold values determine the pixel color comparisons used to identify the token regions and are each based upon a Euclidean distance between pixels in a color space, and vary the threshold values in selected areas of the image to vary a level of analysis precision for pixel color comparisons used to identify the token regions, for token identification among the selected areas of the image.

7. The computer program product of claim 6 wherein the process step to vary the threshold values in selected areas of the image is carried out to vary threshold values such that resulting token regions are relatively more discriminative in a selected area of the image.

8. The computer program product of claim 6 wherein the process step to identify token regions in the image as a function of pixel color comparisons relative to threshold values is carried out by performing pixel color comparisons in each of a seed step and a grow step.

9. The computer program product of claim 8 wherein different threshold values are used in each of the seed step and grow step.

* * * * *